United States Patent

[11] 3,594,829

| [72] | Inventor | Everett R. Seek |
| | | Rockville, Md. |
| [21] | Appl. No. | 16,493 |
| [22] | Filed | Mar. 4, 1970 |
| [45] | Patented | July 27, 1971 |
| [73] | Assignee | Wayne Musgrove |
| | | Hyattsville, Md. |
| | | a part interest |

[54] FOOT-OPERATED FLUSH VALVE ATTACHMENT
8 Claims, 2 Drawing Figs.

[52] U.S. Cl. ................................................. 4/108
[51] Int. Cl. ........................................... E03d 13/00
[50] Field of Search ........................................... 4/108, 100,
101, 102, 249; 137/630.15, 630.17

[56] References Cited
UNITED STATES PATENTS

| 653,437 | 7/1900 | Burgar et al. | 137/630.15 |
| 1,241,037 | 9/1917 | Sharp, Jr. | 4/108 UX |
| 1,483,939 | 2/1924 | Jaeger | 4/108 |
| 1,740,860 | 12/1929 | Hansen | 4/108 |
| 2,467,019 | 4/1949 | Farson | 4/108 |
| 2,703,409 | 3/1955 | Manning et al. | 4/108 X |
| 3,314,084 | 4/1967 | Balikjian | 4/249 |

Primary Examiner—Henry K. Artis
Attorney—B. P. Fishburne, Jr.

ABSTRACT: A foot pedal actuated attachment kit for urinal and commode flush valves features a closed hydraulic system interconnecting the valve element to be unseated and the foot pedal operator. The device is characterized by simplicity of construction and ease of installation on new or existing plumbing fixtures. The device offers the advantage of sanitation through lessening the spread of disease transmitted by the hands.

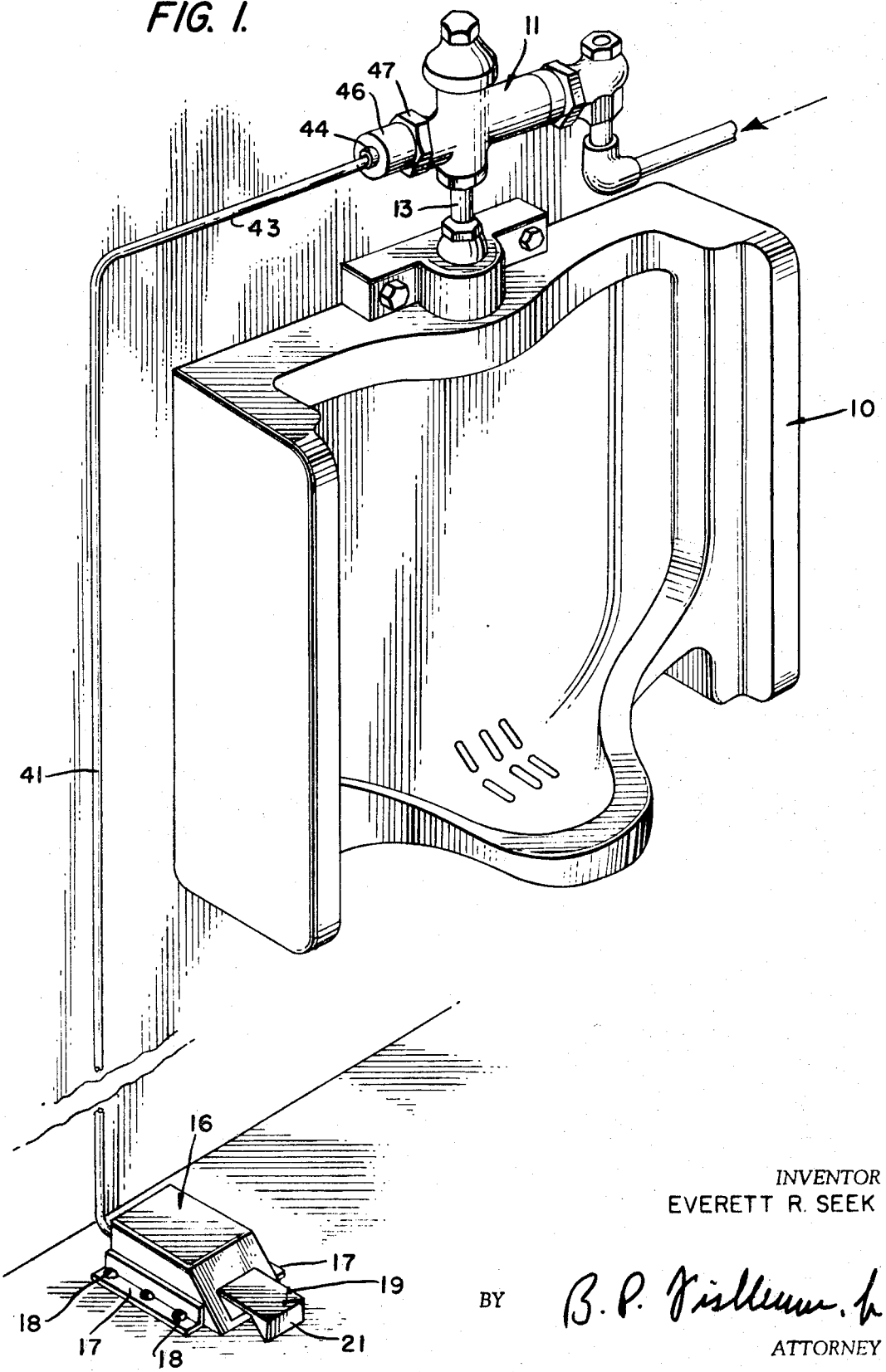

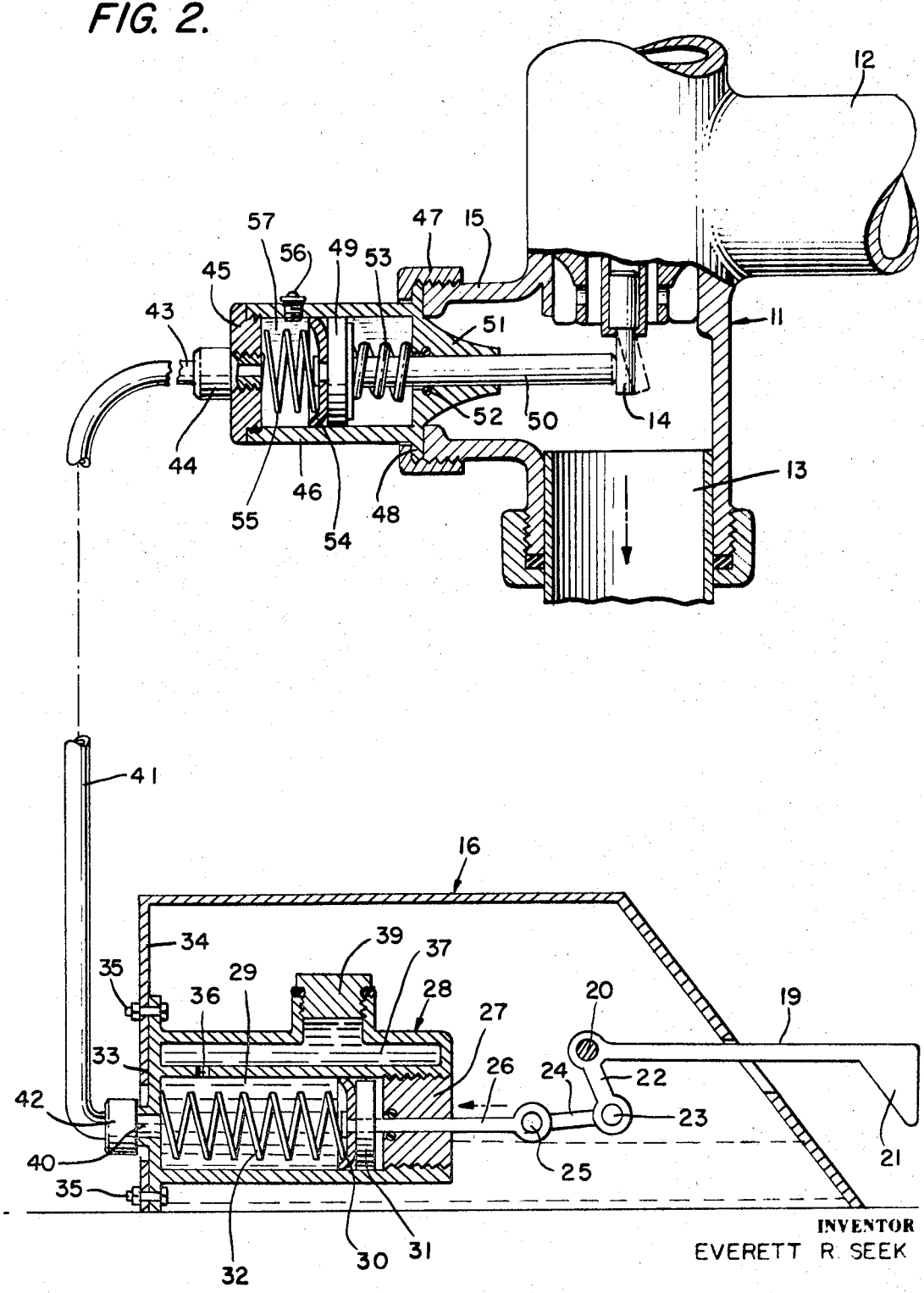

FOOT-OPERATED FLUSH VALVE ATTACHMENT

BACKGROUND OF THE INVENTION

Foot-operated remote flushing controls for urinals and commodes are known, but none of these prior art devices has proven totally practical for several reasons. Some of the prior art devices require the installation of additional pipes or valves inside building walls or require cutting of walls and floors to mount components. In general, the prior art devices tend to be awkward and complicated and therefore none-economical. Some examples of the prior art are U.S. Pat. Nos. 1,483,939; 1,740,860; 1,226,716 and 653,437.

The object of the invention is therefore to improve upon the prior art by providing a completely practical, rugged and reliable flush valve operating mechanism which is economical to manufacture and install and adaptable to substantially any conventional urinal or commode having a hand-operated flushing valve. Installation is accomplished by simply removing the handle operator of the valve and in its place attaching the hydraulic operator of the present invention. The operating attachment or mechanism is entirely external with relation to the wall and floor and requires no cutting of the wall or floor and no additional pipes or valves. The invention is very simplified, neat in appearance and requires very little servicing. There are no parts to be touched by the hands in use and therefore the spreading of disease germs is considerably lessened. Other features and advantages of the invention will be apparent during the course of the following description.

This application contains subject matter in common with prior copending application Ser. No. 8,517, filed Feb. 4, 1970, for FLUSH VALVE OPERATING MECHANISM.

BRIEF DESCRIPTION OF DRAWING FIGURES

FIG. 1 is a perspective view of a urinal equipped with the foot-operated flush valve actuating attachment embodying the invention.

FIG. 2 is an enlarged fragmentary vertical section through the valve and the valve operating attachment, parts broken away.

DETAILED DESCRIPTION

Referring to the drawings in detail wherein like numerals designate like parts, the numeral 10 designates a wall mounted urinal having a top mounted flush valve 11 of the class shown in U.S. Pat. 2,633,141, such valves being commonly known as Sloan valves.

Referring to FIG. 2, the valve 11 has an inlet pipe branch 12 to admit water under pressure and a depending outlet pipe extension 13 coupled thereto and leading to the top of the urinal 10. The release of flushing water is under control of an internal tiltable stem element 14 commonly operated by a handle on a lateral branch extension 15 of the valve body. In the present invention, the handle is removed and the foot-operated actuating means for the valve in the nature of an attachment kit replaces the handle.

The invention comprises a floor-mounted pedal support and housing 16 formed of sheet metal or the like, arranged adjacent one side of the urinal 10 and securely anchored to the floor by angle bars 17 and suitable fasteners 18. The boxlike support 16 partially encloses a foot pedal 19 securely mounted between its ends on a transverse horizontal rocker shaft 20 whose ends are suitably supported on the sidewall of the housing or support 16. The pedal 19 projects forwardly of the support 16 and preferably has a depending floor-engaging limit stop 21 thereon. This prevents a user of the device from damaging the linkage by applying too much pressure to the foot pedal.

Within the housing 16, the pedal 19 has an integral short depending crank arm 22 pivoted at 23 to a short drive link 24, in turn pivotally connected at 25 to a piston rod 26 which reciprocates through a suitable packing or gland 27 in one end of a cylinder body 28 which may be similar or identical to the master cylinder of an automobile hydraulic brake system.

The body 28 has a horizontal cylinder bore 29 adapted to be filled with hydraulic fluid ahead of a plunger cup 30 backed up by a rigid disc 31 or piston on the rod 26. A return coil spring 32 engages the front of the cup 30 and the remote end wall 33 of the body 28, which end wall is bolted to the housing end wall 34 as at 35. The cylinder bore 29 receives its hydraulic fluid through a port 36 leading from a small reservoir chamber 37 in the top of the body 28, having a filling plug 39.

At its forward end, the cylinder bore or chamber 29 has an outlet opening 40 connected with a copper transmission tube 41 by means of any suitable fluid tight fitting 42. This tube 41 extends upwardly along the wall and then horizontally at 43 toward a similar fitting 44 which connects the tube 41 into a cap 45 carried by the outer end of a cylinder extension 46. The cylinder extension 46 is coupled to the valve extension 15 by a nut 47 which is a standard part of the valve assembly, the nut engaging a flange 48 of the cylinder extension 46.

Within the bore of cylinder extension 46 is a piston or disc 49 carried by a reciprocating rod 50 having guided engagement in a bearing portion 51 of the cylinder extension and sealed therein as at 52. The rod 50 upon retraction is adapted to engage and tilt the stem 14 so that flushing water is admitted to the fixture through the pipe 13. This mode of operation is conventional in Sloan valves.

A return spring 53 surrounds the rod 50 ahead of the bearing portion 51 and bears against the back of piston 49 to urge the same outwardly and away from the stem 14 so that the stem is normally vertical and untilted for closing the flushing valve. A plunger cup 54 is carried by the forward side of piston 49 and a light spring 55 within the bore of cylinder extension 46 opposes the cup 54. The cylinder extension 46 is equipped with a conventional air bleed 56. Hydraulic fluid from the tube 41 fills the cylinder chamber 57 between the cup 54 and cap 45.

In operation, when it is desired to flush the fixture, the foot pedal 19 is depressed and through the associated linkage the piston 30—31 is advanced in the chamber 29 and hydraulic fluid is instantly forced into the chamber 57 to push the rod 50 toward the stem 14 for tilting it so as to release flushing water. When the foot is removed from the pedal 19, the springs automatically return the parts to the nonflushing positions shown in FIG. 2.

The mechanism is very simple and substantially foolproof and its use avoids the necessity for touching plumbing fixtures in public accommodations with the hands.

It is to be understood that the form of the invention herewith shown and described is to be taken as a preferred example of the same and that various changes in the shape, size and arrangement of parts may be resorted to, without departing from the spirit of the invention or scope of the subjoined claims.

I claim:

1. A foot-operated mechanism for actuating a toilet fixture flush valve having a stem which must be tilted to release flushing water into the fixture, said mechanism comprising a cylinder piston unit on said valve including a reciprocating element adapted to engage and tilt said stem and a return spring for the reciprocating element, a foot pedal operated cylinder piston unit mounted near the floor and including a foot pedal extension for activating the piston of the second-named cylinder piston unit, a fluid conduit means interconnecting the first and second cylinder piston units, and a body of liquid within the cylinders of said units in opposing relation to the pistons therein so that movement of the piston in the second-named unit will cause a like movement of the piston in the first-named unit.

2. The structure as defined in claim 1, and a support for the second-named cylinder piston unit adapted to be mounted on a floor, a foot pedal pivoted to said support, and a linkage means interconnecting the foot pedal and the piston of the second-named cylinder piston unit.

3. The structure as defined in claim 1, and said fluid conduit means comprising a tube interconnecting said first named and second named cylinder piston units and having a fluidtight connection with each unit.

4. The structure as defined in claim 2, and said support comprising a boxlike housing substantially enclosing and concealing the second named cylinder piston unit and having an opening through which said foot pedal projects for use.

5. The structure as defined in claim 4, and a positive stop element on said foot pedal engageable with the floor to protect the foot pedal and associated linkage from excessive force.

6. The structure as defined in claim 1, and said first named cylinder piston unit including a cylinder body having a flange adapted to abut the end face of a tubular extension on the flush valve, and a coupling nut carried by said extension and engaging said flange and serving to firmly couple the same to said end face.

7. The structure as defined in claim 2, and said linkage means comprising a crank arm integral with said foot pedal and projecting laterally therefrom, the foot pedal pivot being offset from the axis of the piston of said second named unit, and a drive link pivotally interconnecting the rod of said piston and the crank arm of the foot pedal.

8. The structure as defined in claim 4, and the second named cylinder piston unit having a cylinder body including a flange, and means firmly attaching said flange to a wall of said boxlike housing so that the cylinder body is supported on said wall.